United States Patent
Leibman et al.

(10) Patent No.: US 11,374,950 B2
(45) Date of Patent: Jun. 28, 2022

(54) ANOMALY DETECTION IN COMPLEX SYSTEMS

(71) Applicant: The MITRE Corporation, McLean, VA (US)

(72) Inventors: Leonid Leibman, Weston, MA (US); Michael S. Downs, Burlington, MA (US)

(73) Assignee: The MITRE Corporation, McLean, VA (US)

(*) Notice: Subject to any disclaimer, the term of this patent is extended or adjusted under 35 U.S.C. 154(b) by 30 days.

(21) Appl. No.: 16/023,665

(22) Filed: Jun. 29, 2018

(65) Prior Publication Data

US 2020/0007563 A1  Jan. 2, 2020

(51) Int. Cl.
*H04L 9/40* (2022.01)
*H04L 43/08* (2022.01)
*G06K 9/62* (2022.01)

(52) U.S. Cl.
CPC ........ *H04L 63/1425* (2013.01); *G06K 9/6219* (2013.01); *G06K 9/6222* (2013.01); *G06K 9/6247* (2013.01); *H04L 43/08* (2013.01); *H04L 63/1458* (2013.01)

(58) Field of Classification Search
None
See application file for complete search history.

(56) References Cited

U.S. PATENT DOCUMENTS

| | | |
|---|---|---|
| 9,306,960 B1 | 4/2016 | Aziz |
| 9,729,571 B1 | 8/2017 | Ferguson et al. |
| 2014/0003710 A1* | 1/2014 | Seow ............... G06K 9/00771 382/159 |
| 2015/0205692 A1* | 7/2015 | Seto ................. G06F 11/008 702/182 |
| 2016/0344758 A1* | 11/2016 | Cohen .............. G08B 21/18 |
| 2017/0019312 A1 | 1/2017 | Meyer et al. |

(Continued)

FOREIGN PATENT DOCUMENTS

CN  101848160  9/2010

OTHER PUBLICATIONS

Cappers et al., Eventpad: Rapid Malware Analysis and Reverse Engineering Using Visual Analytics, 2018, 2018 IEEE Symposium on Visualization for Cyber Security (VIZSEC) (Year: 2018).*

(Continued)

*Primary Examiner* — Luu T Pham
*Assistant Examiner* — Edward X Long
(74) *Attorney, Agent, or Firm* — Morrison & Foerster LLP

(57) ABSTRACT

Described are systems and methods for detecting an anomaly among a plurality of components operating in a system. In some embodiments, a method includes monitoring a plurality of metrics for the plurality of components across a plurality of time periods. For each time period, the plurality of components is clustered into a plurality of clusters based on measurement information corresponding to the plurality of metrics received for the time period. For each component, a plurality of correspondences is determined between the clusters in which the component is grouped for a plurality of pairs of adjacent time periods. Then, whether each component is operating anomalously can be determined based on the plurality of determined correspondences.

15 Claims, 6 Drawing Sheets

(56) References Cited

U.S. PATENT DOCUMENTS

| | | |
|---|---|---|
| 2017/0099208 A1 | 4/2017 | Wang et al. |
| 2017/0104657 A1 | 4/2017 | Gopalakrishnan et al. |
| 2017/0124478 A1 | 5/2017 | Baradaran et al. |
| 2017/0279829 A1 | 9/2017 | Vasseur et al. |
| 2019/0306178 A1* | 10/2019 | Weizman ............ G06K 9/6228 |
| 2019/0378010 A1* | 12/2019 | Morris ............... G06Q 20/4016 |

OTHER PUBLICATIONS

Faridi et al., Performance Evaluation of Features and Clustering Algorithms for Malware, 2018 IEEE International Conference on Data Mining Workshops (ICDMW), pp. 13-22 (Year: 2018).*

Goldstein, Markus et al. (2016) "A Comparative Evaluation of Unsupervised Anomaly Detection Algorithms for Multivariate Data," PLOS One, DOI:10.1371/journal.pone.0152173; retrieved from https://www.ncbi.nlm.nih.gov/pmc/articles/PMC4836738/; 31 pages.

Mazel, Johan (2011) "Unsupervised network anomaly detection," Networking and Internet Architecture (cs.NI)INSA de Toulouse, English, retrieved from https://tel.archives-ouvertes.fr/tel-00667654; 131 pages.

* cited by examiner

ANOMALY DETECTION IN COMPLEX SYSTEMS

FIELD OF THE DISCLOSURE

This disclosure relates generally to detecting anomalies in a complex system. In particular, this disclosure relates to clustering similar components from a plurality of components and analyzing clustering behavior of the plurality of components across a plurality of time periods.

BACKGROUND OF THE DISCLOSURE

Enterprise computing environments today commonly include large, complex networks of devices (e.g., a network device such as a routers or firewalls or a computing device such as a server). Detecting performance anomalies in these networks is an important objective for many enterprises to provide consistent service and to detect potential malicious attacks and threats. For example, network anomalies may be a result of malicious attacks such as a Distributed Denial of Service (DDoS) attacks or can result from misconfiguration, device performance degradation, or even failure.

Many current anomaly detection methods rely on historical trend analysis in which a device's operations are compared with a range of operating behaviors observed for that device during normal operation. In these methods, the device may be detected as being in anomalous operation if that device's operations deviate from the normal range of operating behaviors. Large, complex networks, however, often operate in volatile environments and the devices in these networks may not have a consistent range of operating behaviors during normal operation. Therefore, these anomaly detection methods are likely to fail to detect if a device is behaving anomalously, or erroneously identify an excessive number of devices as exhibiting anomalous behavior.

SUMMARY OF THE DISCLOSURE

To address the problems in current anomaly detection methods, the present disclosure is directed to methods and systems for anomaly detection based on clustering analysis of a plurality of components in a system across a plurality of time periods, according to some embodiments. In particular, between a first and a second time period adjacent to each other in a time series, a clustering characteristic of a component is compared with the clustering characteristics of other components in the first and second adjacent time periods to determine whether the component is operating anomalously.

In some embodiments, the component can be clustered into a first cluster with a first plurality of components in the first time period and clustered into a second cluster with a second plurality of components in the second time period. In some embodiments, the first plurality of components is compared with the second plurality of components to determine whether the component is in anomalous operation. In some embodiments, the first and second clusters can be determined to correspond to each other based on a number of common components determined between the first and second plurality of components. If the first and second clusters in which the component is assigned do not correspond to each other, a score corresponding to the component can be modified to indicate a higher likelihood that the component is operating anomalously. For example, the score can be increased upon determining that the first and second clusters do not correspond to each other. In some embodiments, the component can be determined to be operating anomalously if the score exceeds an anomaly threshold.

In some embodiments, a method of detecting an anomaly among a plurality of components operating in a system, includes: monitoring a plurality of metrics of the plurality of components across a plurality of time periods, each metric of a component relating to an operation or a performance of the component for a time period of the plurality of time periods; for a first time period of the plurality of time periods, clustering the plurality of components into a first plurality of clusters based on a first plurality of measurements obtained in the first time period, the first plurality of measurements corresponding to the plurality of metrics monitored in the first time period, wherein a first component of the plurality of components is assigned to a first cluster of the first plurality of clusters; for a second time period of the plurality of time periods, clustering the plurality of components into a second plurality of clusters based on a second plurality of measurements obtained in the second time period, the second plurality of measurements corresponding to the plurality of metrics monitored in the second time period, wherein the first component is assigned to a second cluster of the second plurality of clusters; determining a correspondence of the first and second clusters based on a number of common components determined between the first and second clusters; and determining whether the first component is operating anomalously based on the determined correspondence.

In some embodiments, determining the correspondence of the first and second clusters includes: computing a first proportion of components in the first cluster that are common to the second cluster; computing a second proportion of components in the second cluster that are common to the first cluster; and determining that the first cluster and the second cluster correspond to each other if at least one of the first proportion and the second proportion exceeds a threshold proportion.

In some embodiments, the first proportion of components and the second proportion of components are each computed based on the determined number of common components between the first and second clusters.

In some embodiments, the plurality of metrics includes one or more of a central processing unit (CPU) usage, a memory usage, or a throughput.

In some embodiments, the second time period is adjacent to the first time period in a time series.

In some embodiments, the clustering is performed using an unsupervised clustering algorithm that does not require a number of clusters as an input. In some embodiments, the unsupervised clustering algorithm includes density-based spatial clustering of applications with noise (DBSCAN), affinity propagation, or agglomerative clustering.

In some embodiments, a system of detecting an anomaly among a plurality of components comprises one or more processors and memory storing one or more programs that when executed by the one or more processors cause the one or more processors to: monitor a plurality of metrics of the plurality of components across a plurality of time periods, each metric of a component relating to an operation or a performance of the component for a time period of the plurality of time periods; for a first time period of the plurality of time periods, cluster the plurality of components into a first plurality of clusters based on a first plurality of measurements obtained in the first time period, the first plurality of measurements corresponding to the plurality of metrics monitored in the first time period, wherein a first component of the plurality of components is assigned to a first cluster of the first plurality of clusters; for a second time period of the plurality of time periods, cluster the plurality of components into a second plurality of clusters based on a second plurality of measurements obtained in the second time period, the second plurality of measurements corresponding to the plurality of metrics monitored in the second time period, wherein the first component is assigned to a second cluster of the second plurality of clusters; determine a correspondence of the first and second clusters based on a number of common components determined between the first and second clusters; and determine whether the first component is operating anomalously based on the determined correspondence.

In some embodiments, a non-transitory computer-readable storage medium includes instructions for detecting an anomaly among a plurality of components operating in a system, wherein the instructions, when executed by one or more processors, cause the one or more processors to perform instructions including: monitoring a plurality of metrics of the plurality of components across a plurality of time periods, each metric of a component relating to an operation or a performance of the component for a time period of the plurality of time periods; for a first time period of the plurality of time periods, clustering the plurality of components into a first plurality of clusters based on a first plurality of measurements obtained in the first time period, the first plurality of measurements corresponding to the plurality of metrics monitored in the first time period, wherein a first component of the plurality of components is assigned to a first cluster of the first plurality of clusters; for a second time period of the plurality of time periods, clustering the plurality of components into a second plurality of clusters based on a second plurality of measurements obtained in the second time period, the second plurality of measurements corresponding to the plurality of metrics monitored in the second time period, wherein the first component is assigned to a second cluster of the second plurality of clusters; determining a correspondence of the first and second clusters based on a number of common components determined between the first and second clusters; and determining whether the first component is operating anomalously based on the determined correspondence.

BRIEF DESCRIPTIONS OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION

Figure 1:
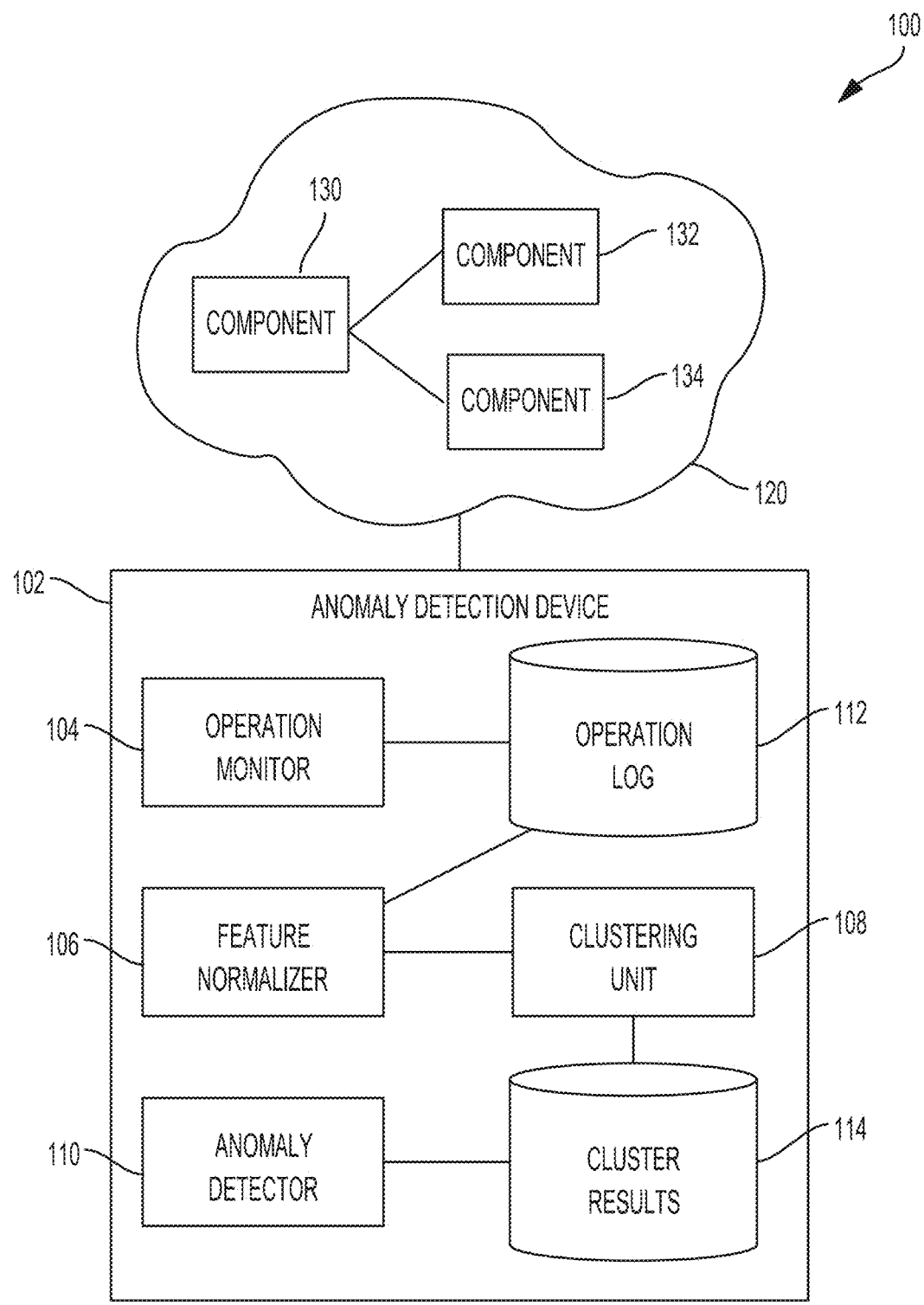
FIG. 1 illustrates a system for detecting anomalies among a plurality of components operating in a system, according to some embodiments.

Described herein are systems and methods for detecting anomalies among a plurality of components operating in a system. In some embodiments, an anomaly detection device receives measurement information for a plurality of metrics of the plurality of components for a plurality of time periods in a time series. In some embodiments, the plurality of time periods includes a first time period and a second time period adjacent to the first time period. The anomaly detection device clusters the plurality of components into a first plurality of clusters for the first time period and a second plurality of clusters for the second time period based on measurement information received for the plurality of components in a respective time period. In contrast to historical trend analysis of a component, as used by conventional anomaly detection methods, the anomaly detection device can be configured to analyze how that component is clustered with other components across adjacent time periods to determine whether that component is in anomalous operation.

Accordingly, a potential anomaly of the component can be detected irrespective of the variability of the system as manifested in the measurement information for the component being monitored across the plurality of time periods. For example, network traffic (i.e., an example of measurement information) on a retailer's e-commerce servers (i.e., examples of components) may be significantly higher on days with promotional sales (e.g., Black Friday) as compared to other days. On such days with promotional sales, many e-commerce servers may have atypically high network traffic not due to abnormalities of the e-commerce servers themselves; rather, the atypically network traffic may be due to a change in the system, i.e., the increased number of shoppers hunting for discounts and making online purchases. Whereas conventional anomaly detection methods may not be able to identify an e-commerce server operating anomalously because many e-commerce servers have higher network traffic than usual, the anomaly detection methods disclosed herein may identify such an e-commerce server as operating anomalously upon determining that its operating behavior deviates from that of other e-commerce servers sharing similar characteristics (e.g., clustering behavior).

As discussed above, the anomaly detection device clusters the plurality of components into the first plurality of clusters for the first time period and a second plurality of clusters for the second time period based on measurement information received for the plurality of components in a respective time period. In some embodiments, a score can be generated for each component from the plurality of components to represent a likelihood that the component is operating anomalously. In some embodiments, the score can be modified to represent an increased likelihood of anomalous operation if any one of the following three conditions is met: the component is neither assigned to any cluster of the first plurality of clusters in the first time period nor assigned to any cluster of the second plurality of clusters in the second time period; the component is assigned to a first cluster of the first plurality of clusters, but not assigned to any cluster of the second plurality of clusters; or the component is assigned to the first cluster in the first time period and assigned to a second cluster of the second plurality of clusters, but the first and second clusters are determined to not correspond to each other.

In some embodiments, for a component assigned to the first cluster in the first time period and assigned to the second cluster in the second time period, the anomaly detection device determines a correspondence between the first cluster and the second cluster based on a number of common components determined between the first and second clusters to determine whether the component is in anomalous operation. For example, the anomaly detection device may increase a score for the component to indicate a higher likelihood of anomalous operation upon determining that the first and second clusters do not correspond to each other. In some embodiments, the anomaly detection device determines that the first cluster and the second cluster correspond to each other if at least: a first proportion of components in the first cluster and common to the second cluster exceeds a threshold proportion, or a second proportion of components in the second cluster and common to the first cluster exceeds the threshold proportion. In some embodiments, the anomaly detection device determines that that the first and second clusters do not correspond to each other if the first and second clusters do not correspond to each other.

FIG. 1 illustrates a system 100 including an anomaly detection device 102 for detecting anomalies among a plurality of components 130-134 operating in a system 120, according to some embodiments. In some embodiments, an anomaly in a component may refer to performance degradation as caused by, for example, a malicious attack (e.g., a cyberattack), misconfiguration, faulty hardware, or a component failure. For ease of illustration, only three components 130-134 are shown in system 100. In practice, however, system 100 many include hundreds or thousands of components. System 100 includes an anomaly-detection device 102 coupled to system 120 through a network to detect whether one or more of components 130-134 are operating anomalously. In some embodiments, the network may include a local area network (LAN), a wide area network (WAN), the Internet, a Wi-Fi network, a WiMAX network, a cellular network (e.g., 3G, 4G, 4G Long Term Evolution (LTE)), or a combination thereof. Further, network 102 may implement one or more wired and/or wireless standards or protocols.

In some embodiments, system 120 can be a complex system having multiple interdependent components 130-134, which makes modeling the behavior of components 130-134 difficult and computationally intensive. In some embodiments, components 130-134 may include hardware devices such as servers, network devices, or storage devices within a computer network. In some embodiments, network devices may include hubs, switches, routers, access points, bridges, etc.

As discussed above, system 120 often includes components 130-134 that have a high degree of variability in operation behavior caused by overall system dynamics, which renders ineffective traditional, historical trend analysis. In some embodiments, operation of system 120 may depend on the environment or other factors causing substantial changes in the behavior of the system's components 130-134. For example, for a network of e-commerce servers (i.e., an example of system 120), a release of new retail products may cause more consumers to make online purchases, which increases the overall load of the e-commerce servers. In this example, many servers may have higher bandwidth than normal not because those servers are operating anomalously per se; rather, a change in the overall system induced a change in the typical operation behavior of those servers. In some embodiments, the anomaly detection methods disclosed herein can filter the overall effects of system dynamics on the components' operations to determine whether any one component is operating anomalously.

In another example, system 120 may represent a network of streaming servers to provide users with streaming video. The users' typical demand for video may vary widely from day-to-day depending on new content being released, breaking news announcements, or other factors that cannot be anticipated. For example, on days with breaking news, the streaming servers may experience higher network traffic not because any one server is operating anomalously per se; rather more users are streaming video due to external events (e.g., breaking news).

Although the present disclosure describes components 130-134 in the context of a computer network where components can correspond to network elements (e.g., servers, routers, etc.), components 130-134 may correspond to elements in other complex systems. In some embodiments, components 130-134 can represent a plurality of user accounts operating within a social media network (i.e., an example of system 120). For example, the social media network may be Facebook™ or Twitter™. In these embodiments, the post activity of each user account may vary widely depending on external events (e.g., a political election, a holiday, sporting event, a terrorist attack, etc.) that induces a change in post activity for many users, which makes anomaly detection of a specific user as behaving suspiciously or anomalously difficult. For example, a Californian election may cause social media users in California to become more active on their social media accounts in a social media network. This change in user behavior among Californian user accounts may not indicate anomalous behavior for those user accounts; rather, the increased user activity may be a result in the change in the overall system (e.g., external event causing increased activity).

In some embodiments, to detect whether an anomaly is present in system 120, anomaly-detection device 102 includes the following units: operation monitor 104, feature normalizer 106, clustering unit 108, and anomaly detector 110. Anomaly-detection device 102 further includes operation log 112 and clustering results 114, as will be further described below.

In some embodiments, operation monitor 104 can be configured to receive a plurality of metrics of components 130-134 across a plurality of time periods in a time series. In some embodiments, a time period includes a predetermined duration of time, e.g., 1 minute, 15 minutes, 1 hour, 8 hours, 1 day, etc. For each time period, operation monitor 104 may receive a plurality of measurements corresponding to the plurality of metrics for each of components 130-134. In some embodiments, a metric of one of components 130-134 can include data indicating an operation or a performance of that component.

In some embodiments, where components 130-134 include a computing device or a memory device, the metric can include, for example: computer processing unit (CPU) utilization, memory usage, CPU load throughput, storage usage, network bandwidth usage, disk activity, etc. For example, the measurements corresponding to one or more of the metrics listed above may include one or more of the following: a percent processor time, context switches per second, processor queue length, a percent memory usage, available memory, page reads, page faults, a percent free space in disk, percent idle time of disk, average number of disk bytes read/write over one second, disk transfers per second, bytes sent per second, bytes received per second, etc.

In some embodiments, where components 130-134 include a user account operating in a social media network, the metric can include, for example, a post rate, a messaging rate, an average messaging length, etc. Further metrics may include a number of reposts, a number of follows, a number of likes, etc. In some embodiments, metrics can be collected for one or more time durations (e.g., per minute, per hour, per day, etc.)

In some embodiments, operation log 112 can be configured to store the metrics information received by operation monitor 104. In some embodiments, operation log 112 can store a plurality of measurements for clusters 130-134 for each time period. As discussed above, the plurality of measurements correspond to the plurality of metrics being monitored for each of clusters 130-134. Since each metric corresponds to a different operating characteristic of a component, the values for two different metrics may vary widely or be on vastly different scales.

In some embodiments, to ensure that the plurality of measurements for each component can be commensurately compared, feature normalizer 106 can be configured to normalize the metrics information stored in operation log 112 for each time period. In some embodiments, feature normalizer 106 can be configured to normalize the metrics information for each time period separately and take into account only the metrics information within that time period. In some embodiments, feature normalizer 106 can implement principle component analysis (PCA) to normalize the metrics information, as will be further described below with respect to FIG. 4.

In some embodiments, clustering unit 108 can be configured to cluster one or more components of the plurality of components 130-134 into a plurality of clusters for each time period based on the measurement information received in that time period for the plurality of components 130-134. For example, a first component may be assigned with other components to a first cluster of the plurality of clusters while a second component may not be assigned to any cluster. In some embodiments, to improve clustering accuracy, clustering unit 108 can be configured to cluster the plurality of components 130-134 based on the measurement information, as normalized by feature normalizer 106.

In some embodiments, to perform component clustering, clustering unit 108 implements an unsupervised clustering algorithm that does not require a number of clusters as an input. For example, the clustering algorithm may include density-based spatial clustering of applications with noise (DBSCAN), affinity propagation, agglomerative clustering, etc. The results generated by clustering unit 108 may be stored in clustering results 114, according to some embodiments.

In general, the clustering algorithm may cluster components by analyzing the measurement information between components to determine whether two or more components are similar enough to be grouped together and whether grouped components constitute a cluster. In some embodiments, the clustering algorithm can determine whether the grouped components represent a cluster based on one or more parameters determined for the grouped components. For example, a parameter may include a size of the cluster (i.e., a number of grouped components), a density of the cluster, distance measure between the components, etc.

In some embodiments, to enable similarities to be calculated, each component can be represented as a vector (i.e., herein referred to as a point in vector space) where the elements in the vector correspond to the measurement information for that vector. For example, one element in the vector may correspond to a measurement for a metric (e.g., CPU load, throughput, bandwidth usage, etc.) being monitored. Then, a similarity between two components or clusters can be calculated based on a distance function between the vectors corresponding to the components or clusters, according to some embodiments. The distance function used in clustering components can be a distance metric calculated between pairs of vectors. For example, the distance metric between two vectors may be a Euclidean distance, which is defined as the square root of the sum of the squares of the differences between the corresponding elements of the two vectors.

Although clustering algorithms typically differ in the functions they perform to determine whether two or more components belong in the cluster, many clustering algorithms perform clustering based on a distance function between vectors. For example, DBSCAN cluster components based on density within the vector space for the points corresponding to the plurality of components where each cluster is determined to be a maximal set of density-connected points. In DBSCAN, a plurality of components is grouped into one or more clusters based on three parameters: a distance function (e.g., Euclidean distance), an epsilon representing a maximum distance (i.e., referred to a radius) from a point in vector space, and a minimum number of points within a neighborhood of the point where the neighborhood is defined as objects (i.e., points) that are within a radius of epsilon away from the point. Points that are within the epsilon distance from each other and that are in respective neighborhoods with a high density (e.g., having at least the minimum number of points) may be grouped into the same cluster. DBSCAN may operate by performing this grouping mechanism for the plurality of components to generate a plurality of clusters. A point that is not grouped with any other point may be referred to as an outlier and may be an indication that the component corresponding to the point is in anomalous operation for that time period.

In another example, the clustering algorithm may be hierarchical clustering, which also operates based on a distance function. The distance function may be, without limitation, a Euclidean distance, a squared Euclidean distance, a Manhattan distance, a maximum distance, or a Mahalanobis distance. In general, hierarchical clustering generates a hierarchy of clusters based on the distance function and a parameter (e.g., a maximal cluster size or a 'level' in the hierarchy) can be used to determine which level of the hierarchy to use to cluster the plurality of components. In agglomerative clustering (e.g., a form of hierarchical clustering), each component (as represented by a point in vector space) may be initially assigned to its own cluster at a bottom level in the hierarchy. Then, pairs of clusters are merged to generate a next higher level of clusters in the hierarchy. Pairs of clusters may be iteratively merged until only one cluster remains and corresponding to the top level in the hierarchy. In some embodiments, pairs of clusters are merged based on a linkage criteria related to the distance between clusters. For example, the linkage criteria may be any one of the following criteria: a maximum or complete-linkage clustering, a minimum or single-linkage clustering, a mean or average linkage clustering, a centroid linkage clustering, or a minimum energy clustering.

In some embodiments, regardless of the specific clustering algorithm that clustering unit 108 implements, clustering unit 108 can be configured to assign one or more of components 130-134 with the same cluster ID (e.g. first cluster, second cluster, etc.) in a time period. In some embodiments, two components being assigned the same cluster ID in that time period indicates that clustering unit 108 has determined that the two components operate similarly.

In some embodiments, anomaly detector 110 can be configured to determine whether one or more of components 130-134 are operating anomalously based on clustering results 114. In particular, anomaly detector 110 may receive clustering results 114 indicating how components 130-134 are clustered in each time period of a plurality of time periods in a time series. Results 114 may indicate that a component was not assigned to any clusters within a time period, which may be indicative of anomalous operation in that time period. In some embodiments, while individual components 130-134 may have highly variable operating behavior from time period to time period, groups of similar components (e.g., grouped into the same cluster) are statistically likely to behave in a similar manner and to remain cohesive across the plurality of time periods. Therefore, anomaly detector 110 can be configured to detect an anomaly by analyzing the clustering behavior of components 130-134 between adjacent time periods in the time series, as will be further described with respect to FIG. 2. For example, a first component assigned to a first cluster with like components in the first time period may be assigned to a second cluster in the second time period that does not contain any of the like components of the first cluster. This clustering characteristic may indicate that the first component is operating anomalously.

Figure 2:
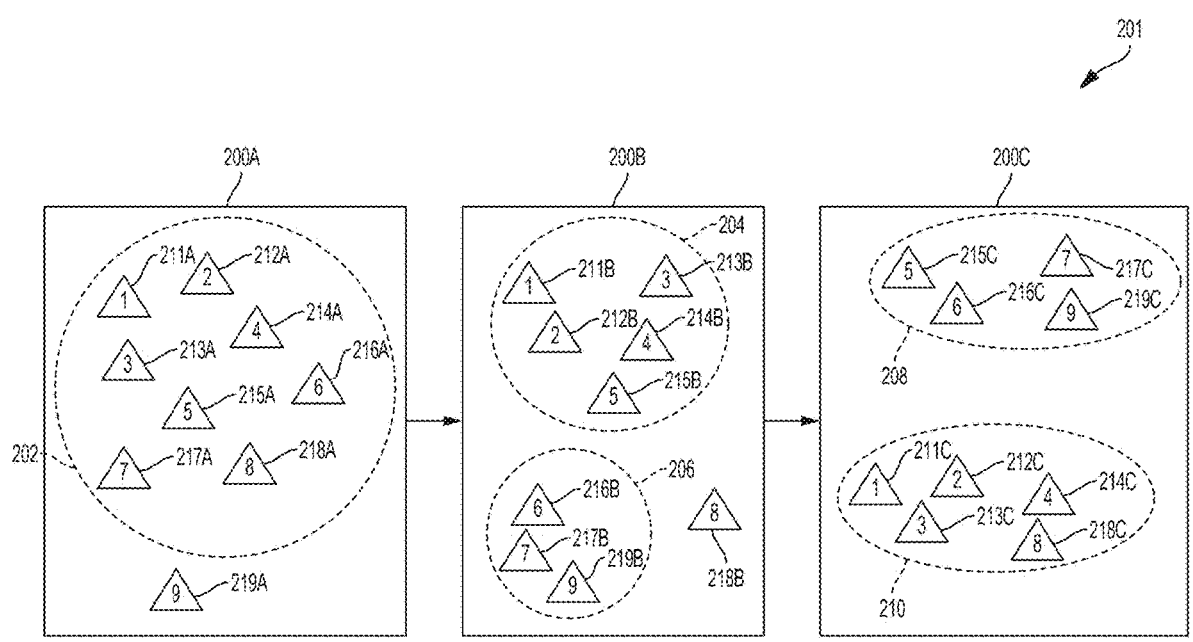
FIG. 2 illustrates a diagram showing example clustering behavior for a plurality of components across a plurality of time periods, according to some embodiments.

FIG. 2 illustrates a diagram 201 showing example clustering behavior for a plurality of components 211-219 across a plurality of time periods 200A-C, according to some embodiments. Specifically, diagram 201 shows three types of clustering behavior that may indicate one or more of components 211-219 are operating anomalously. In some embodiments, diagram 201 graphically represents the clustering information, e.g., clusters 202-210, for each of time periods 200A-C, as stored in clustering results 114 of FIG. 1. For example, the clustering information in time period 200A, as graphically shown in time period 200A, may be stored in a table of clustering results 114. In some embodiments, clustering unit 108 of FIG. 1 can be configured to perform the clustering. As discussed above, components 211-219 may represent devices (e.g., servers, routers, switches, etc.) operating in a network. The anomaly detection methods disclosed herein may also be performed on a social media network in which components 211-219 may represent user accounts, according to some embodiments.

In some embodiments, in time period 200A, components 211A-219 can be grouped by clustering unit 108 into cluster 202. As discussed above with respect to FIG. 1, clustering unit 108 can analyze measurement information obtained in time period 200A for components 211A-219A to determine how to cluster components 211A-219A. For example, components 211A-219A may represent devices in a network in which case examples of measurement information may include CPU load throughput, memory storage usage, network bandwidth, etc. Other measurement information are described above with respect to components 130-134 of FIG. 1, In some embodiments, clustering unit 108 groups components 211A-219A into one or more clusters 202 based on the analyzed measurement information where each of clusters 202 includes at least a threshold number of components. This threshold number may be input by a user or a default parameter as set by a clustering algorithm. In some embodiments, as described above with respect to FIG. 1, clustering unit 108 can be configured to perform clustering using an unsupervised clustering algorithm such as DBSCAN, hierarchical clustering, or affinity propagation. These clustering algorithms may evaluate the measurement information received for each of components 211A-219A to group similar components with each other into one or more clusters 202.

In some embodiments, one type of clustering behavior that may indicate an anomaly is if a component is not grouped into any clusters by clustering unit 108. For example, as shown in time period 200A, component 219A is not assigned to any clusters including cluster 202. In some embodiments, anomaly detector 110 may track a number of instances that a component is not grouped into any clusters across a plurality of time periods 200A-C to determine whether that component is in anomalous operation.

In time period 200B adjacent to time period 200A, components 211B-219B may be grouped into clusters 204-206 based on measurement information for components 211B-219B that were received for time period 200B. For example, when components 211B-219B represent network devices (e.g., switches or routers), measurement information such as network bandwidth or CPU load may be used to group similarly operating components 211B-219 into one or more clusters. As shown in diagram 201, clustering unit 108 may group components 211B-215B and 216B-219B into clusters 204 and 206, respectively.

In some embodiments, a second type of clustering behavior that may indicate an anomaly is if a component assigned to a cluster in a first time period is not grouped into any clusters in a second time period following and adjacent to the first time period. For example, as shown in diagram 201, component 218A that was previously grouped into cluster 202 with components 211A-217B does not belong to any of clusters 204-206 in time period 200B. For example, component 218 may be a networking device that functions similar to its peers (and grouped into the same cluster 202) until, for example, a software misconfiguration caused its operating characteristic to differ from that of its peers. For example, the software misconfiguration may cause component 218 to enter a suspended mode where no network packets can be routed. In such an example, as shown in diagram 201, the clustering algorithm implemented by clustering unit 108 may determine that component 218B does not belong to any cluster 204 or 206 because its network bandwidth of 0 bits per second renders its operating behavior dissimilar from every other of components 211B-217B and 219B.

In some embodiments, the clustering algorithm may perform statistical analysis on the measurement information for each of the components 211-219 to group components 211-219 into different clusters of similarly operating components. In some embodiments, each cluster may include components that have similar operating profiles. For example, cluster 204 may include components 211B-215B that have high bandwidth and low memory usage. In contrast, cluster 206 may include components 216B, 217B, and 219B that have, for example, high bandwidth and high memory usage.

In time period 200C adjacent to time period 200B, components 211C-219C may be grouped into clusters 208-210 based on measurement information for components 211C-219C that were received for time period 200C. As shown in diagram 201, clustering unit 108 may group components 211C-214C and 218C into cluster 210 and components 215C-217C and 219C into cluster 208.

In some embodiments, for a component assigned to a first cluster in a first time period and assigned to a second cluster in a second time period adjacent to the first time period, a third type of clustering behavior that may indicate anomalous operation can be determined based on a number of common components between the first and second clusters. In some embodiments, the component may exhibit possible anomalous behavior if both: a first proportion of components in the first cluster that are common to the second cluster is less than a threshold proportion, and a second proportion of components in the second cluster that are common to the first cluster is less than the threshold proportion. For example, as shown in diagram 201, component 215B that was previously grouped into cluster 204 with its peer components 211B-214B may be grouped into cluster 208 at time period 200C. Cluster 208 includes only one component (i.e., component 215B) from the five components 211B-215B of cluster 204 and therefore cluster 208 contains only 20% of the components of cluster 204, which may fall below an example threshold proportion of 50%.

In contrast, a component such as component 211B grouped into cluster 204 at time period 200B is grouped into cluster 210, which includes four components 211C-214C of the five components 211B-215B of cluster 204. Thus, between time periods 200B and 200C, component 211B was grouped from a first cluster (i.e., cluster 204) to a second cluster (i.e., cluster 210) that includes a proportion of components of the first cluster (e.g., 4/5=80%) exceeds a threshold proportion (e.g., 50%). Therefore, anomaly detector 110 may determine that component 211 is in normal operation from time period 200B to 200C because at least one of the following two conditions are met: a first proportion of components in cluster 204 (i.e., 80%) being included in cluster 210 exceeds a threshold proportion (e.g., 50%), and a second proportion of components in cluster 210 (i.e., 80%) being included in cluster 204 exceeds the threshold proportion (e.g., 50%).

In some embodiments, the first proportion of components in cluster 204 that are common to (i.e., included in) cluster 210 and exceeding the threshold proportion may be analogous to cluster 204 being "contained in" cluster 210. This may be the case when a cluster in a first time period "splits into" multiple clusters in a second, adjacent time period. Similarly, the second proportion of components in cluster 210 that are common to (i.e., included in) cluster 204 and exceeding the threshold proportion may be analogous to cluster 210 being "part of" cluster 204. This may be the case when a cluster in a first time period "merges with" one or more clusters in a second, adjacent time period.

Figure 3:
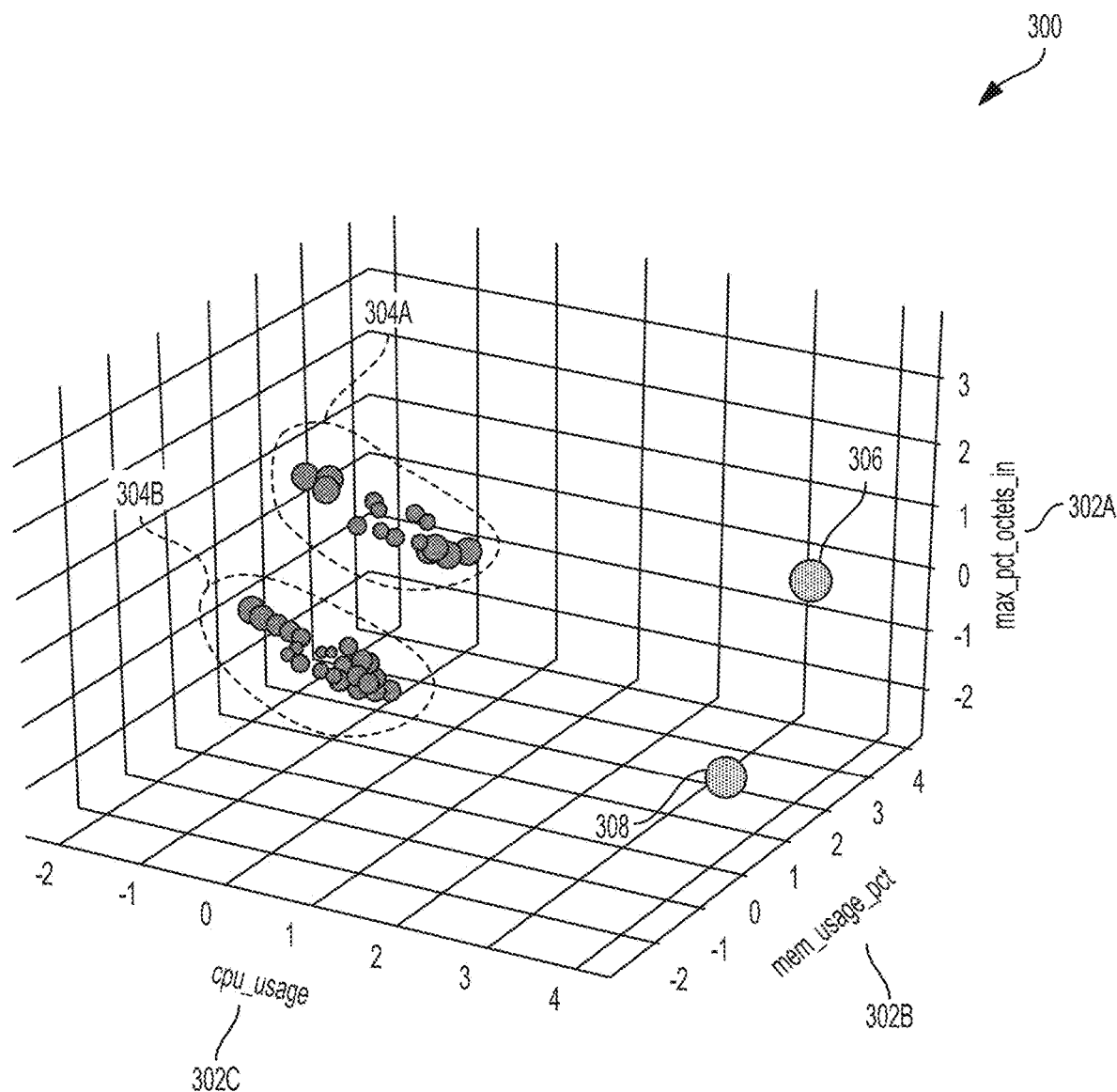
FIG. 3 illustrates a graph showing a plurality of components grouped into a plurality of clusters at a time period, according to some embodiments.

FIG. 3 illustrates a graph 300 showing a plurality of components grouped into a plurality of clusters 304A-B at a time period, according to some embodiments. Graph 300 shows three example metrics 302A-C (e.g., throughput 302A, memory usage 302B, and CPU usage 302C) of the plurality of components being monitored. In some embodiments, as described above with respect to FIG. 1, each component may be represented as a point (e.g., a vector) in a vector space where the position of the point (e.g., elements in the vector) corresponds to the plurality of metrics being monitored. For example, as shown in graph 300, a component may be represented by a circle and a position of the component may represent three measurements corresponding to the three metrics 302A-C of the plurality of components that are being monitored. In some embodiments, the measurement information of metrics 302A-C for the plurality of components may be stored in operation log 112, as described with respect to FIG. 1.

In some embodiments, the measurement information for each of metrics 302A-C may be normalized by feature normalizer 106, as described with respect to FIG. 1. Accordingly, as shown in diagram 300, the scales for metrics 302A-C remain consistent. Further, clustering unit 108 may be configured to implement an unsupervised clustering algorithm (e.g., DBSCAN) to cluster the plurality of components into clusters 304A-B. As described above, each of the components may be represented by a vector including elements that represent the measurement information for each component. In some embodiments, the clustering algorithm may cluster the plurality of components based on a distance function (e.g., Euclidean distance) calculated between pairs of vectors corresponding to respective pairs of components. In some embodiments, a cluster may be determined by the clustering algorithm to include components such that every component in the cluster is within a threshold distance with at least one other component in that cluster. The threshold distance may be a default value or configured based on an input from a user.

As shown in graph 300, clustering unit 108 may determine that components 306-308 do not belong to any of clusters 304A-B, which may indicate an anomaly as described above with respect to FIG. 2.

Figure 4:
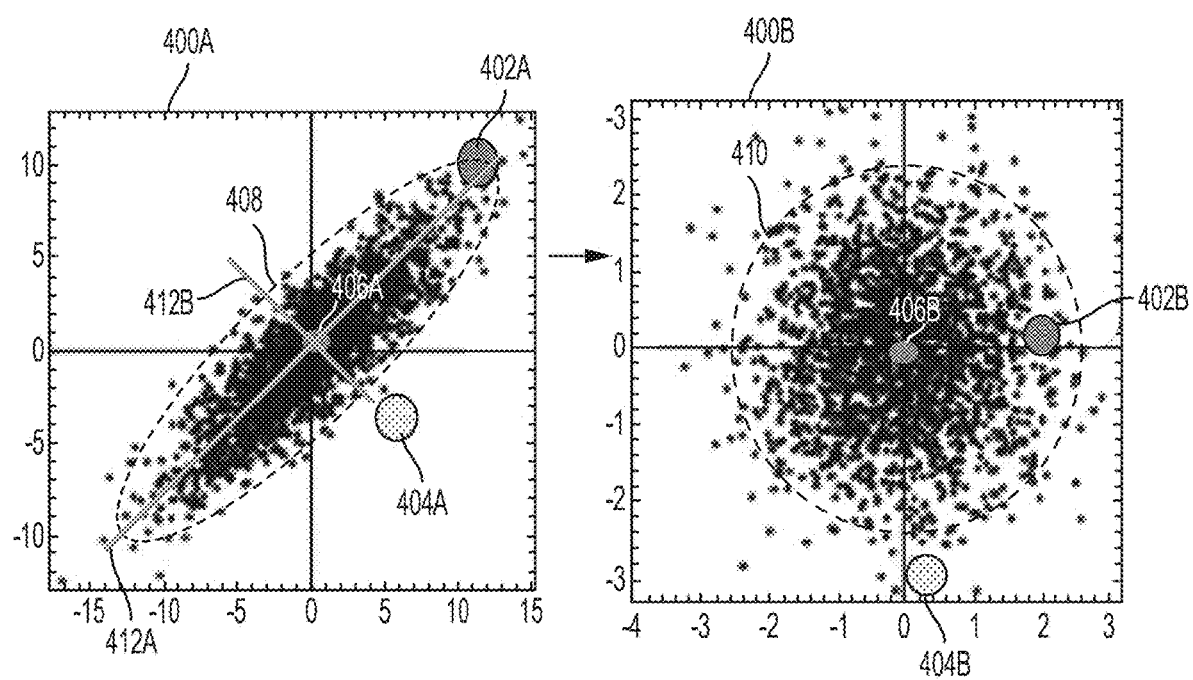
FIG. 4 illustrates diagrams showing the effect of feature normalization, according to some embodiments.

FIG. 4 illustrates diagrams 400A-B showing the effect of feature normalization, according to some embodiments. For example, diagram 400A is a chart showing measurement values for a plurality of metrics (e.g., two metrics as represented by the x-axis and the y-axis) for a plurality of components (e.g., as represented by the circles) at one time period. As described above with respect to FIG. 1, the plurality of components may correspond to network devices operating in a network. In this example, the two metrics for the x-axis and the y-axis may correspond to CPU usage 302C and memory usage percentage 302B, respectively, as shown and described with respect to FIG. 3.

In some embodiments, feature normalizer 106 of FIG. 1 can be configured to implement principle component analysis (PCA) to normalize the measurement values for the plurality of metrics within the one time period such that the measurement values are adjusted, as shown in chart 400B, and can be appropriately compared. In some embodiments, to normalize the measurement information, feature normalizer 106 can be configured to project a principle ellipsoid 408 onto the measurement information of chart 400A and determine mutually perpendicular axes 412A and 412B of the principle ellipsoid 408. In some embodiments, the semi-axes of the ellipsoid correspond to the variance of the measurement data projected onto the axis.

In some embodiments, to normalize the measurement information, feature normalizer 106 can be configured to subtract the coordinates of the center 406A of the principle ellipsoid 408 from the coordinates of the individual components. Then, the measurement information of the individual component is transformed into the basis of the principle axes 412A and 412B. Finally, the transformed measurement information is divided by the corresponding semi-axes to scale the measurement information appropriately.

In effect, as shown in charts 400A-B, as the measurement information for the plurality of components is transformed to the principal axes 412A and 412B, the principal ellipsoid 408 in chart 400A becomes a sphere 410 in chart 400B where the x-axis and the y-axis of chart 400B corresponds to principal axes 412A and 412B, respectively. In some embodiments, components in the region 402A may be far from the cluster center 406A are not necessarily anomalous along the direction of naturally large variance (e.g., along principal axis 412A) while components in the region 404A close to the center 406A may in fact be highly separated from the cluster if they are located in a direction of small variance (e.g., along principal axis 412B). For example, once appropriately normalized in chart 400B, components in region 402B are located close to the cluster center 406B, but components located in region 404B are located much farther from the cluster center 406B of sphere 410. Further, the distances of 402B and 404B from the cluster center 406B are comparable because the measurement information has been normalized across the axes of greatest variance of the measurement information as represented by the mutually perpendicular principal axes 412A and 412B of principle ellipsoid 408 shown in chart 400A.

Figure 5:
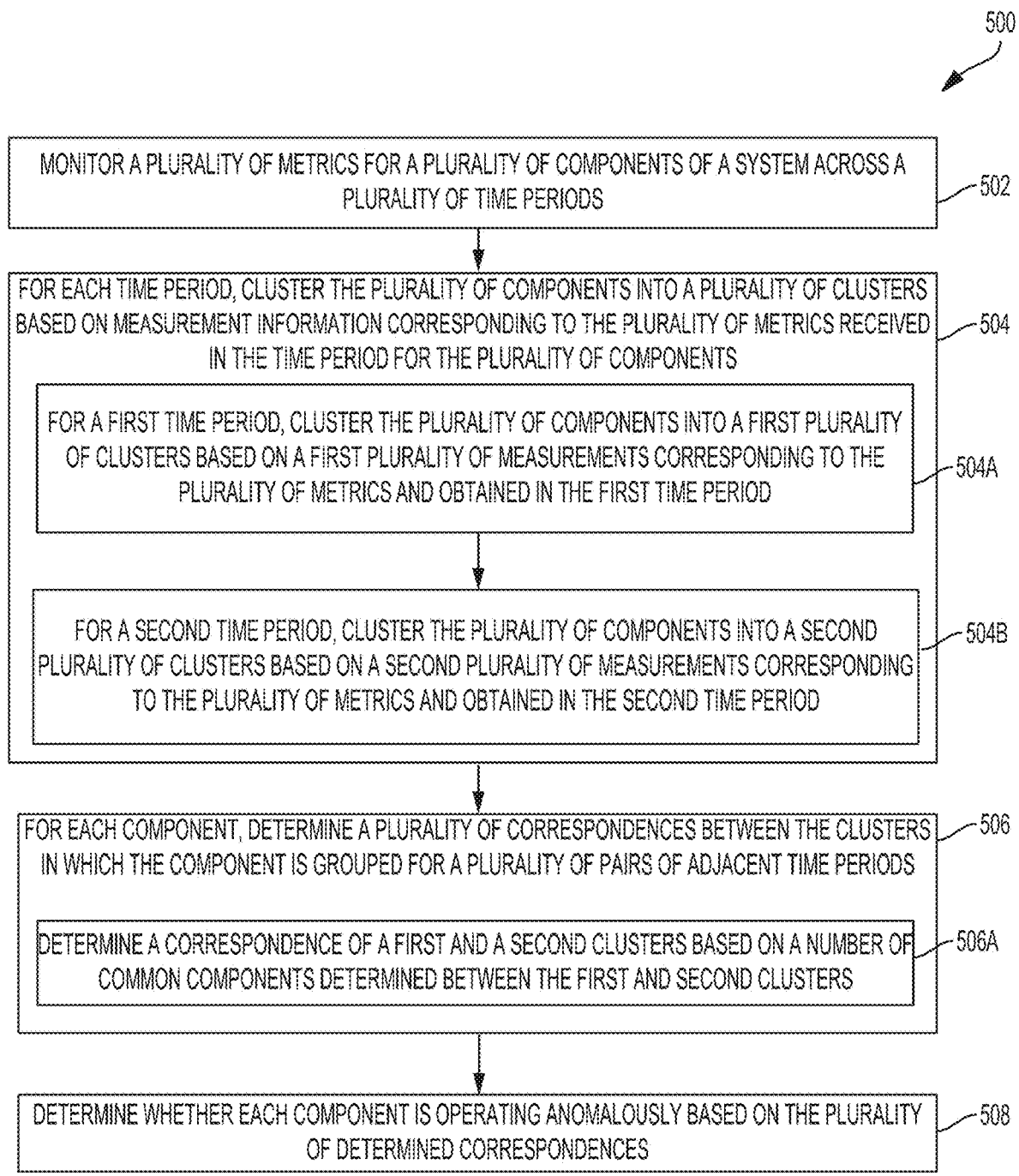
FIG. 5 illustrates a method for detecting an anomaly for a plurality of components operating in a system, according to some embodiments.

FIG. 5 illustrates a method 500 for detecting an anomaly for a plurality of components operating in a system, according to some embodiments. Method 500 can be performed by an anomaly detection device such as anomaly detection device 102, as described with respect to FIG. 1. Accordingly, one or more of the steps below may reference the components of anomaly detection device 102. Method 500 can be performed by a computing system with one or more processors and a memory (e.g., the computing system 600 illustrated in FIG. 6). Method 500 may be included in one or more programs stored in the memory that, when executed by the one or more processors, cause the one or more processors to perform method 500.

In step 502, the anomaly detection device monitors a plurality of metrics for a plurality of components of a system across a plurality of time periods. In some embodiments, each metric relates to an operation or a performance of the component for a time period of the plurality of time periods. Accordingly, for each time period, there may be a plurality of metrics monitored for each component. For example, when a component is a network device (e.g., a router or a switch), a metric being monitored for a time period may relate to the network device's bandwidth or performance such as bits per second, packets per second, connections per second, transactions per second, etc. monitored at the time period. When the component is a server node, for example, metrics being monitored may include one or more of CPU information (e.g., percent processor time, context switches per second, processor queue length, etc.), memory information (e.g., percent usage, available memory, page reads, page faults, etc.), disk information (e.g., percent free space, percent idle time, average number of bytes read/write over one second, disk transfers per second, etc.) or network information (e.g., bytes sent per second, bytes received per second, retransmission rate, etc.) In some embodiments, the anomaly detection device receives measurement information corresponding to the plurality of metrics for each time period of the plurality of time periods.

In step 504, for each time period of the plurality of time periods, the anomaly detection device clusters the plurality of components into a plurality of clusters based on measurement information corresponding to the plurality of metrics received in the time period for the plurality of components. In some embodiments, each component is assigned to only one cluster or determined to be an outlier not belonging to any cluster of the plurality of clusters. In some embodiments, before clustering the plurality of components, the anomaly detection device normalizes the measurement information, as described above with respect to FIGS. 1 and 3.

In some embodiments, step 504 includes steps 504A-B related to a first time period and a second time period of the plurality of time periods. In some embodiments, the first time period is adjacent to the second time period in a time series.

In step 504A, for the first time period, the anomaly detection device clusters the plurality of components into a first plurality of clusters based on a first plurality of measurements corresponding to the plurality of metrics and obtained in the first time period. In some embodiments, each component is either uniquely assigned to a cluster of the first plurality of clusters or not assigned to any clusters. In some embodiments, the anomaly detection device can be configured to execute an unsupervised clustering algorithm on the plurality of components to assign a first component of the plurality of components to a first cluster of the first plurality of clusters based on the first plurality of measurements.

In step 504B, for the second time period, the anomaly detection device clusters the plurality of components into a second plurality of clusters based on a second plurality of measurements corresponding to the plurality of metrics and obtained in the second time period. In some embodiments, each component is either uniquely assigned to a cluster of the first plurality of clusters or not assigned to any clusters. In some embodiments, the anomaly detection device can be configured to execute the unsupervised clustering algorithm on the plurality of components to assign the first component to a second cluster of the second plurality of clusters based on the second plurality of measurements.

In step 506, for each component, the anomaly detection device determines a plurality of correspondences between the clusters in which the component is grouped for a plurality of pairs of adjacent time periods of the plurality of time periods. In some embodiments, the anomaly detection device can determine a correspondence between two clusters by comparing the components assigned to one cluster with those assigned to the other cluster. In some embodiments, the determination may indicate one of the three types of clustering behavior, as described above with respect to FIG. 2, and may indicate the component is in anomalous operation.

In some embodiments, step 506 includes steps 506A. In step 506A, for the first component described in steps 504A-B, the anomaly detection device determines a correspondence of the first and second clusters based on a number of common components determined between the first and second clusters. As described above, the first and second clusters correspond to the first and second adjacent time periods, which represent one pair of the plurality of pairs of adjacent time periods described with respect to step 506.

In some embodiments, to determine the correspondence based on the determined number of common components, the anomaly detection device computes: a first proportion of components in the first cluster that are common to the second cluster; and a second proportion of components in the second cluster that are common to the first cluster. For example, to determine the first proportion, the anomaly detection device may divide the determined number of common components by the total number of components in the first cluster. Similarly, to determine the second proportion, the anomaly detection device may divide the determined number of common components by the total number of components in the second cluster. In some embodiments, the anomaly detection device can be configured to determine that the first cluster and the second cluster correspond to each other if at least one of the first proportion and the second proportion exceeds a threshold proportion. In some embodiments, the threshold proportion may be set based on: an input from a user, a default value, a number of components in the first cluster, a number of components in the second cluster, or a combination thereof.

In some embodiments, a score can be generated for each component to represent a likelihood that the component is operating anomalously. In some embodiments, the score for each component may be modified to represent an increased likelihood of anomalous operation if any one of the following three conditions is met: the component is neither assigned to any cluster of the first plurality of clusters in the first time period nor assigned to any cluster of the second plurality of clusters in the second time period; the component is assigned to a first cluster of the first plurality of clusters, but not assigned to any cluster of the second plurality of clusters; or the component is assigned to the first cluster in the first time period and assigned to a second cluster of the second plurality of clusters, but the first and second clusters are determined to not correspond to each other. Accordingly, the score may reflect the determination of the plurality of correspondences in step 506. For example, the score for a component may be incremented whenever the clusters in which the component is assigned in adjacent time periods do not correspond to each other.

In step 508, the anomaly detection device determines whether each component is operating anomalously based on the plurality of determined correspondences of step 506. In some embodiments, for the first component described in steps 504A-B, determining a correspondence between the first cluster and the second cluster generated for the first time period and a second time period, respectively, may indicate that the first component is operating normally. In contrast, the first and second clusters determined to be unrelated, i.e., no correspondence, may be an indication that the first component is operating anomalously between the first and second time periods.

In some embodiments, the anomaly detection device can be configured to determine if the first component is operating anomalously based on a number of determined correspondences for the plurality of pairs of adjacent time periods. In some embodiments, the anomaly detection device can determine that the first component is in anomalous operation if the number of determined correspondences is less than a threshold value. For example, in four adjacent time periods (i.e., T1, T2, T3, and T4), the first component may be clustered into four respective clusters (i.e., C1, C2, C3, and C4). In this example, the anomaly detection device may compare each pair of cluster of the three pairs of clusters (i.e., C1 and C2, C2 and C3, and C3 and C4) corresponding to the three pairs of adjacent time periods (e.g., T1 and T2, T2 and T3, and T3 and T4) to determine that only one correspondence (e.g., C1 and C2) exists. Further, the anomaly detection device may determine an anomaly in the operation of the first component because the determined one correspondence is less than, for example, a threshold value of two.

In some embodiment, whether each component is operating anomalously can be determined based on a score maintained by the anomaly detection device for each component across the plurality of time periods, as described with respect to FIG. 506. As discussed above, the score can be representative of a likelihood that the component is operating anomalously. Further, the score may be incremented by a predefined value (e.g., one) whenever the component is assigned to a first cluster in a first time period, assigned to a second cluster in a second, adjacent time period, and the first cluster is determined to not correspond to the second cluster. In these embodiments, the anomaly detection device determines that a component is in anomalous operation if the score for the component exceeds a threshold score.

Figure 6:
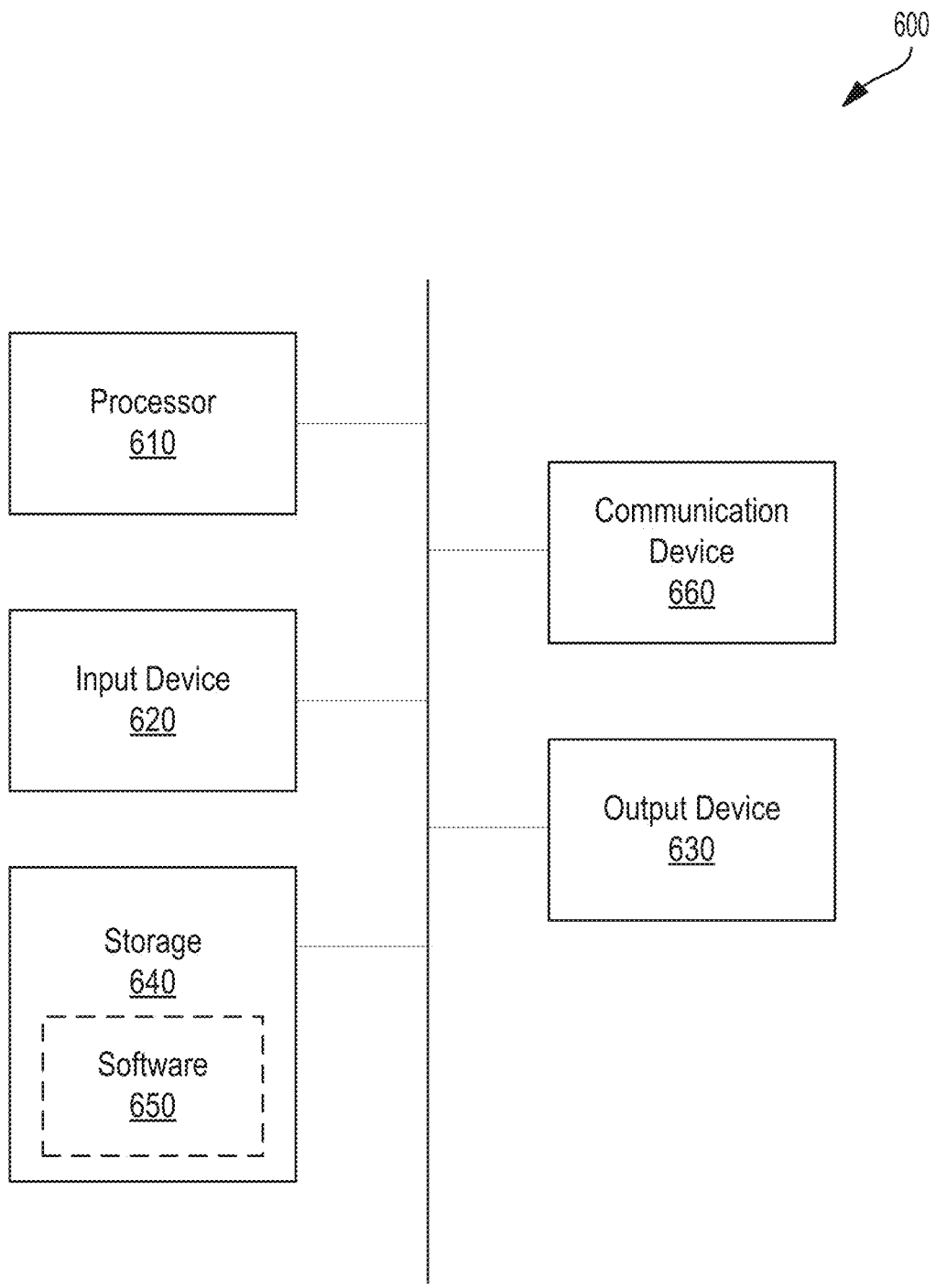
FIG. 6 illustrates an example of a computing device in accordance with one embodiment.

FIG. 6 illustrates an example of a computer in accordance with one embodiment. Computer 600 can be a component of a system for detecting anomalies for a plurality of components operating in a system according to the systems and methods described above, such as system 100 of FIG. 1, or can include the entire system itself. In some embodiments, computer 600 is configured to execute a method for detecting anomalies, such as method 500 of FIG. 5.

Computer 600 can be a host computer connected to a network. Computer 600 can be a client computer or a server. As shown in FIG. 6, computer 600 can be any suitable type of microprocessor-based device, such as a personal computer, workstation, server, or handheld computing device, such as a phone or tablet. The computer can include, for example, one or more of processor 610, input device 620, output device 630, storage 640, and communication device 660. Input device 620 and output device 630 can correspond to those described above and can either be connectable or integrated with the computer.

Input device 620 can be any suitable device that provides input, such as a touch screen or monitor, keyboard, mouse, or voice-recognition device. Output device 630 can be any suitable device that provides an output, such as a touch screen, monitor, printer, disk drive, or speaker.

Storage 640 can be any suitable device that provides storage, such as an electrical, magnetic, or optical memory, including a random access memory (RAM), cache, hard drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein, such as method 500 of FIG. 5.

Software 650, which can be stored in storage 640 and executed by processor 610, can include, for example, the programming that embodies the functionality of the present disclosure (e.g., as embodied in the systems, computers, servers, and/or devices as described above). In some embodiments, software 650 can include a combination of servers such as application servers and database servers.

Software 650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method of detecting an anomaly among a plurality of components operating in a computing system, comprising:
communicatively coupling an anomaly detection device to the plurality of components operating in the computing system, wherein the anomaly detection device is configured to receive data from each component of the plurality of components;
at the anomaly detection device, monitoring a plurality of metrics of the plurality of components across a plurality of time periods comprising a first time period and a second time period adjacent to the first time period, wherein each metric is based on the data received at the anomaly detection device from each of the components of the plurality of components operating in the computing system, each metric of a component relating to an operation or a performance of the component during the operation of the computing system for a time period of the plurality of time periods;

for the first time period, clustering the plurality of components into a first plurality of clusters based on a first plurality of measurements of the components obtained in the first time period, the first plurality of measurements corresponding to the plurality of metrics monitored in the first time period, wherein a first component of the plurality of components is assigned to a first cluster of the first plurality of clusters;

for the second time period, clustering the plurality of components into a second plurality of clusters based on a second plurality of measurements of the components obtained in the second time period, the second plurality of measurements corresponding to the plurality of metrics monitored in the second time period, wherein the first component is assigned to a second cluster of the second plurality of clusters; and analyzing a clustering behavior of the first component across the plurality of time periods to determine whether the first component is operating anomalously, wherein analyzing the clustering behavior comprises determining whether the first cluster to which the first component is assigned and the second cluster to which the first component is assigned for the first and second adjacent time periods correspond to each other based on a number of common components determined between the first and second clusters, and wherein determining whether the first and second clusters correspond to each other comprises computing a first proportion of components in the first cluster that are common to the second cluster, computing a second proportion of components in the second cluster that are common to the first cluster, and determining that the first cluster and the second cluster correspond to each other if at least one of the first proportion and the second proportion exceeds a threshold proportion;

determining the presence of one or more anomalies in each component of the plurality of components, wherein the determination is based on the determination of whether the first cluster to which the first component is assigned and the second cluster to which the first component is assigned for the first and second adjacent time periods correspond to each other based on a number of common components determined between the first and second clusters; and configuring one or more components of the plurality of components based on the determined presence of one or more anomalies in each component of the plurality of components.

2. The method of claim 1, wherein the first proportion of components and the second proportion of components are each computed based on the determined number of common components between the first and second clusters.

3. The method of claim 1, wherein the plurality of metrics comprises one or more of a central processing unit (CPU) usage, a memory usage, or a throughput.

4. The method of claim 1, wherein the clustering is performed using an unsupervised clustering algorithm that does not require a number of clusters as an input.

5. The method of claim 4, wherein the unsupervised clustering algorithm comprises density-based spatial clustering of applications with noise (DBSCAN), affinity propagation, or agglomerative clustering.

6. A system of detecting an anomaly among a plurality of components operating in a computing system comprising an anomaly detection device, wherein the anomaly detection device is communicatively coupled to each component of the plurality of components in the computing system, wherein the anomaly detection device is configured to receive data from each component of the plurality of components, and wherein the anomaly detection device includes one or more processors and memory storing one or more programs that when executed by the one or more processors cause the one or more processors to:

monitor a plurality of metrics of the plurality of components across a plurality of time periods comprising a first time period and a second time period adjacent to the first time period, each metric of a component relating to an operation or a performance of the component during the operation of the computing system for a time period of the plurality of time periods;

for the first time period, cluster the plurality of components into a first plurality of clusters based on a first plurality of measurements of the components obtained in the first time period the first plurality of measurements corresponding to the plurality of metrics monitored in the first time period, wherein a first component of the plurality of components is assigned to a first cluster of the first plurality of clusters;

for the second time period, cluster the plurality of components into a second plurality of clusters based on a second plurality of measurements of the components obtained in the second time period, the second plurality of measurements corresponding to the plurality of metrics monitored in the second time period, wherein the first component is assigned to a second cluster of the second plurality of clusters; and analyze a clustering behavior of the first component across the plurality of time periods to determine whether the first component is operating anomalously, wherein analyzing the clustering behavior comprises determining whether the first cluster to which the first component is assigned and the second cluster to which the first component is assigned for the first and second adjacent time periods correspond to each other based on a number of common components determined between the first and second clusters, and wherein determining whether the first and second clusters correspond to each other comprises computing a first proportion of components in the first cluster that are common to the second cluster, computing a second proportion of components in the second cluster that are common to the first cluster, and determining that the first cluster and the second cluster correspond to each other if at least one of the first proportion and the second proportion exceeds a threshold proportion;

determine the presence of one or more anomalies in each component of the plurality of components, wherein the determination is based on the determination of whether the first cluster to which the first component is assigned and the second cluster to which the first component is assigned for the first and second adjacent time periods correspond to each other based on a number of common components determined between the first and second clusters; and configure one or more components of the plurality of components based on the determined presence of one or more anomalies in each component of the plurality of components.

7. The system of claim 6, wherein the first proportion of components and the second proportion of components are computed based on the determined number of common components between the first and second clusters.

8. The system of claim 6, wherein the plurality of metrics comprises one or more of a central processing unit (CPU) usage, a memory usage, or a throughput.

9. The system of claim 6, wherein the clustering is performed using an unsupervised clustering algorithm that does not require a number of clusters as an input.

10. The system of claim 9, wherein the unsupervised clustering algorithm comprises density-based spatial clustering of applications with noise (DBSCAN), affinity propagation, or agglomerative clustering.

11. A non-transitory computer-readable storage medium comprising instructions for detecting an anomaly among a plurality of components operating in a computing system, wherein the instructions, when executed by one or more processors, cause the one or more processors to perform instructions comprising:
- monitoring a plurality of metrics of the plurality of components, at an anomaly detection device communicatively coupled to the plurality of components operating in the computing system, wherein the anomaly detection device is configured to receive data from each component of the plurality of components, across a plurality of time periods comprising a first time period and a second time period adjacent to the first time period, wherein each metric is based on the data received at the anomaly detection device from each of the components of the plurality of components operating in the computing system, each metric of a component relating to an operation or a performance of the component during the operation of the computing system for a time period of the plurality of time periods;
- for the first time period, clustering the plurality of components into a first plurality of clusters based on a first plurality of measurements of the components obtained in the first time period, the first plurality of measurements corresponding to the plurality of metrics monitored in the first time period, wherein a first component of the plurality of components is assigned to a first cluster of the first plurality of clusters;
- for the second time period, clustering the plurality of components into a second plurality of clusters based on a second plurality of measurements of the components obtained in the second time period, the second plurality of measurements corresponding to the plurality of metrics monitored in the second time period, wherein the first component is assigned to a second cluster of the second plurality of clusters; and
- analyzing a clustering behavior of the first component across the plurality of time periods to determine whether the first component is operating anomalously, wherein analyzing the clustering behavior comprises determining whether the first cluster to which the first component is assigned and the second cluster to which the first component is assigned for the first and second adjacent time periods correspond to each other based on a number of common components determined between the first and second clusters, and wherein determining whether the first and second clusters correspond to each other comprises computing a first proportion of components in the first cluster that are common to the second cluster, computing a second proportion of components in the second cluster that are common to the first cluster, and determining that the first cluster and the second cluster correspond to each other if at least one of the first proportion and the second proportion exceeds a threshold proportion;
- determine the presence of one or more anomalies in each component of the plurality of components, wherein the determination is based on the determination of whether the first cluster to which the first component is assigned and the second cluster to which the first component is assigned for the first and second adjacent time periods correspond to each other based on a number of common components determined between the first and second clusters; and
- configure one or more components of the plurality of components based on the determined presence of one or more anomalies in each component of the plurality of components.

12. The computer-readable storage medium of claim 11, wherein the first proportion of components and the second proportion of components are computed based on the determined number of common components between the first and second clusters.

13. The computer-readable storage medium of claim 11, wherein the plurality of metrics comprises one or more of a central processing unit (CPU) usage, a memory usage, or a throughput.

14. The computer-readable storage medium of claim 11, wherein the clustering is performed using an unsupervised clustering algorithm that does not require a number of clusters as an input.

15. The computer-readable storage medium of claim 14, wherein the unsupervised clustering algorithm comprises density-based spatial clustering of applications with noise (DBSCAN), affinity propagation, or agglomerative clustering.

* * * * *